US011754234B2

(12) United States Patent
Wu et al.

(10) Patent No.: US 11,754,234 B2

(45) Date of Patent: Sep. 12, 2023

(54) POWER-GENERATING INSOLE AND LIGHT EMITTING SHOE BASED ON COUPLED POWER GENERATION DEVICES

(71) Applicant: Calson Investment Limited, North Point (HK)

(72) Inventors: Chou Har Wu, North Point (HK); Bingang Xu, Kowloon (HK); Jiale Chai, Kowloon (HK); Meiqi Li, Kowloon (HK)

(73) Assignee: Calson Investment Limited, North Point (HK)

( * ) Notice: Subject to any disclaimer, the term of this patent is extended or adjusted under 35 U.S.C. 154(b) by 61 days.

(21) Appl. No.: 17/463,497

(22) Filed: Aug. 31, 2021

(65) Prior Publication Data

US 2022/0221116 A1 Jul. 14, 2022

Related U.S. Application Data

(60) Provisional application No. 63/136,890, filed on Jan. 13, 2021.

(51) Int. Cl.

| | |
|---|---|
| ***H02N 1/04*** | (2006.01) |
| ***A43B 3/42*** | (2022.01) |
| ***F21L 13/06*** | (2006.01) |
| ***A43B 3/00*** | (2022.01) |
| ***H05B 45/30*** | (2020.01) |

(52) U.S. Cl.

CPC ................ *F21L 13/06* (2013.01); *A43B 3/00* (2013.01); *H05B 45/30* (2020.01)

(58) Field of Classification Search

CPC ........ H05B 45/00; H05B 45/30; H05B 45/40; H05B 45/42; F21L 13/00; F21L 13/06; H02N 1/04; H02N 2/18; H02N 2/181; A43B 3/00; A43B 3/34; A43B 3/36; A43B 3/42; A43B 3/38; H02K 35/00; H02K 35/02; H02K 35/04

See application file for complete search history.

(56) References Cited

U.S. PATENT DOCUMENTS

2004/0217874 A1* 11/2004 Tsou ........................ G08B 5/38 340/686.1
2007/0201221 A1* 8/2007 Cherdak .................. A43B 3/34 36/137
2013/0185961 A1* 7/2013 Tseng ....................... A43B 3/36 36/137
2013/0188341 A1* 7/2013 Tseng ....................... A43B 3/36 362/183
2016/0065091 A1* 3/2016 Wang ....................... H02N 1/04 310/300
2017/0346416 A1* 11/2017 Rutgers .................... H02N 1/04
2018/0180228 A1* 6/2018 Tseng ........................ F21L 4/08
2022/0316439 A1* 10/2022 Cao ...................... H02K 7/1892

* cited by examiner

*Primary Examiner* — Thai Pham

(57) ABSTRACT

The invention discloses a coupled power generating device, a power-generating insole and a light emitting shoe, the device comprising a column-shaped hollow shell, at least one group of magnetic induction coils that is provided on the outer wall of the column-shaped hollow shell, at least one removable column-shaped magnet that is provided on the inner wall of the column-shaped hollow shell, two tribo-electric nano generating units that are provided at both ends of the column-shaped hollow shell. The coupled power generating device has the advantages of long service life, high output current, stable electrical performance and compact size.

9 Claims, 6 Drawing Sheets

(A) Spherical magnet (b) Column-shaped magnet

POWER-GENERATING INSOLE AND LIGHT EMITTING SHOE BASED ON COUPLED POWER GENERATION DEVICES

CROSS REFERENCE TO RELATED APPLICATIONS

The present application claims the benefit of U.S. Provisional Application No. 63/136,890 filed Jan. 13, 2021 and entitled "POWER-GENERATING INSOLE AND LIGHT EMITTING SHOE BASED ON COUPLED POWER GENERATION DEVICES," which is hereby incorporated by reference in its entirety.

TECHNICAL FIELD

The invention involves the fields of textile and garment and energy technology, especially a coupled power generating device, a power-generating insole and a light emitting shoe based.

BACKGROUND

With the development of science and technology and the improvement of people's living standard, people has increasingly high requirements on the fashion sense and the science and technology sense of clothing, and thus various kinds of power-generating insoles and light emitting shoes rise in response to the proper time and conditions. The development of power-generating insoles and light emitting shoes has undergone two phases by now. The first phase is to use chemical batteries for power supply, such as button batteries. These batteries can continuously provide electricity for power-generating insoles and light emitting shoes, meanwhile output high current, and achieve relatively ideal lighting effects, and they are deeply loved by people, especially by children. However, these batteries have some disadvantages of short service life, a need for frequent replacement, and great difficulty of replacement generally. To overcome these disadvantages, power-generating insoles and light emitting shoes entered the second development phase. In the phase, some new-type ways of generating electricity were used, such as triboelectric nanoscale power generation and piezoelectric nanoscale power generation. The triboelectric nanoscale power generation is applied because of its advantages such as large output voltage, relatively stable property, simple production process, and cheap raw materials. The basic principle is that the mechanical energy caused by human motion is converted into electric energy. When walking and running, people will continuously tread the base to generate a mass of mechanical energy which can be converted into electric energy through frictional effect and electrostatic induction, thereby providing electric energy for a power-generating insole and a light emitting shoe. However, its remarkable disadvantage is relatively low output current. Meanwhile, these generating sets have complex production process, unstable property, relatively large volume, and bulky body.

DESCRIPTION OF THE INVENTION

The invention mainly aims at providing a coupled power generating device, a power-generating insole and a light emitting shoe, which has the advantages of long service life, high output current, stable electrical performance and compact size. Applying this power generation device in the light-emitting shoes can make the light-emitting shoes shine for a long time and compact.

One aspect, the invention provide a coupled power generating device, the device comprising a column-shaped hollow shell, at least one group of magnetic induction coils that is provided on the outer wall of the column-shaped hollow shell, at least one removable column-shaped magnet that is provided on the inner wall of the column-shaped hollow shell, two triboelectric nano generating units that are provided at both ends of the column-shaped hollow shell.

Alternatively, the triboelectric nano generating unit comprises a shell packaging plate, an electrode layer, and an insulating layer, the electrode layer is provided at the one side of the packaging plate of the shell close to the column-shaped magnet.

Alternatively, the cross-sectional shape of the column-shaped hollow shell is round or square. The cross-sectional shape of the column-shaped magnet is consistent with that of the shell.

Alternatively, there is a distance of more than 0 mm but less than or equal to 0.5 mm between the column-shaped magnet and the inner wall of the column-shaped hollow shell.

Alternatively, the both ends of the column-shaped magnet are provided with conductive fabric or conductive polymer.

Alternatively, the conductive fabric is conductive silver cloth or copper-nickel alloy cloth.

Alternatively, the magnetic induction coil is tightly twined around the center position of the outer wall of the shell, the magnetic induction coil is not twined around both ends of the outer wall of the shell.

Alternatively, the packaging plate of the shell is a polymer plate with smooth surface.

Alternatively, the ratio of the sum of the cross-sectional dimensions of the column-shaped hollow shell and the wire diameter of the magnetic induction coil, to the sum of the number of turns of the magnetic induction coil and the thickness of the insulating layer is less than or equal to 0.004, or greater than or equal to 0.0085.

Another aspect, the invention provides a power-generating insole, which comprises a coupled power generating device above mentioned.

Another aspect, the invention provides a light emitting shoe, which comprises a base and the electronic unit, the base is the power-generating insole or the cavity of the light emitting shoe, the power-generating insole or the cavity of the light emitting shoe comprises a coupled power generating device above mentioned, the electronic unit at least comprises control circuit and LED light, the electronic unit connected to the both ends of the magnetic induction coils of the coupled power generating device, and the electronic unit connected to the electrode layer which is arranged on the both ends of the coupled power generating device.

Alternatively, the coupled power generating device is fixed horizontally in the base and kept parallel to the axis of the base.

Alternatively, the electronic unit comprises two LED light, the two LED light are parallel connected, and the positive and negative terminals of one of the LED light are connected to the negative and positive terminals of the other LED light.

Beneficial effects in the present invention are as follows: Unlike the prior art, the invention providing coupled power generating device, the device comprising a column-shaped hollow shell, at least one group of magnetic induction coils that is provided on the outer wall of the column-shaped hollow shell, at least one removable column-shaped magnet that is provided on the inner wall of the column-shaped hollow shell, two triboelectric nano generating units that are provided at both ends of the column-shaped hollow shell. Applying this power generation device in the light-emitting shoes can make the light-emitting shoes shine for a long time and compact.

DESCRIPTION OF THE DRAWINGS

Combining with the drawings and the specific embodiment, the invention is further described, and the embodiment, shown in the drawings, is just a schematic diagram only for description of the invention, but not represents the actual size and shape of the coupled power generating device in the invention.

DETAILED DESCRIPTION OF THE EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. The described embodiments are some but not all of the embodiments of the present invention. All other embodiments obtained by persons of ordinary skill in the art based on the embodiments of the present invention without creative efforts shall fall within the protection scope of the present invention. Besides, technical features of the embodiments of the present invention illustrated below can combine with each other as long as there is no conflict.

The invention provides a coupled power generating device, a power-generating insole and a light emitting shoe.

Embodiment 1

Figure 1:
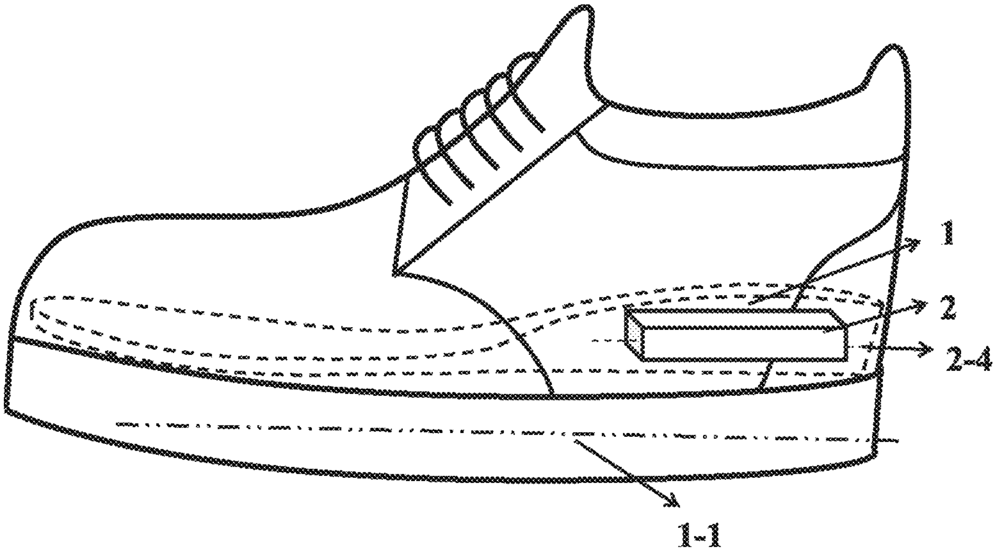
FIG. 1 is the schematic diagram of a light emitting shoe based on a coupled power generating device with a square column-shaped shell in the invention.
Figure 2:
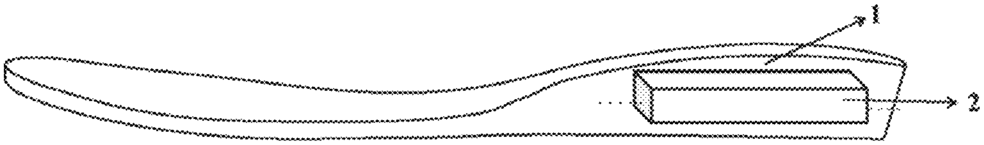
FIG. 2 is the side view of a power-generating insole based on a coupled power generating device with a square column-shaped shell in the invention.
Figure 3:
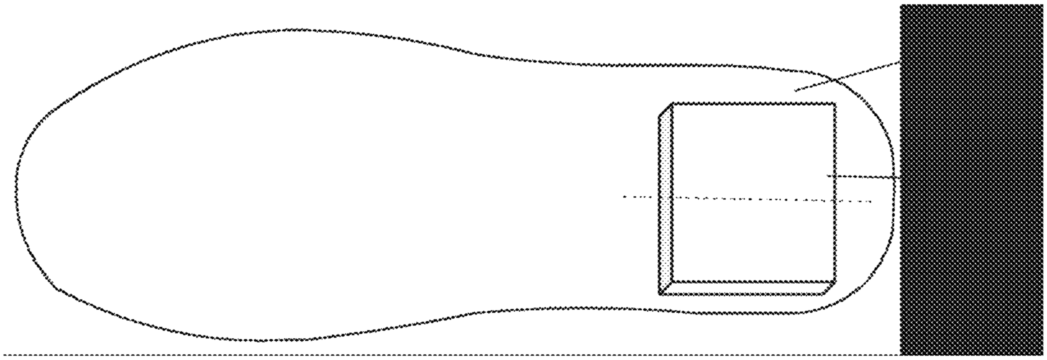
FIG. 3 is the top view of a power-generating insole based on a coupled power generating device with a square column-shaped shell in the invention.
Figure 4:
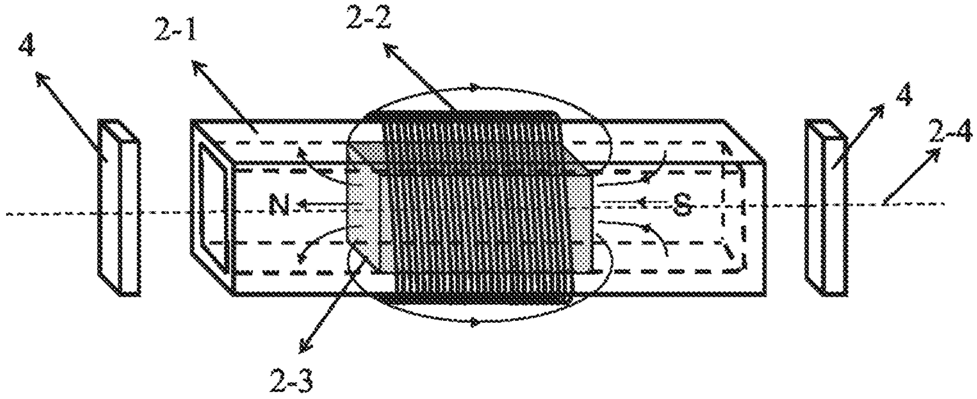
FIG. 4 is the structure diagram of a coupled power generating device (one group of magnetic induction coils) with a square column-shaped shell in the invention.
Figure 5:
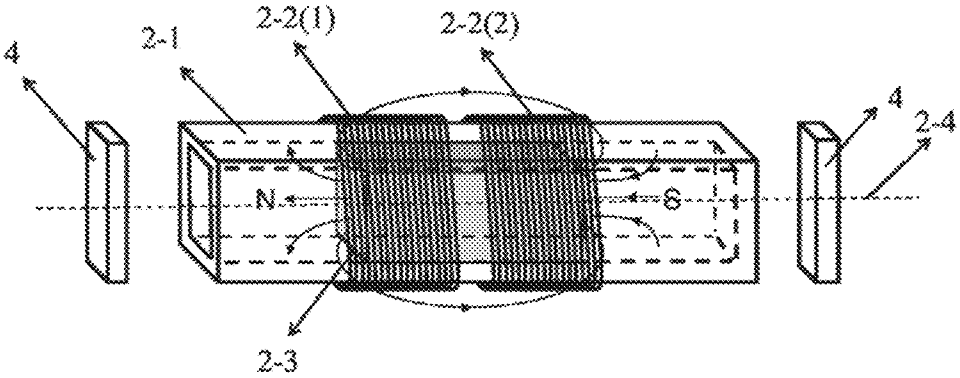
FIG. 5 is the structure diagram of a coupled power generating device (two groups of magnetic induction coils) with a square column-shaped shell in the invention.

As shown in FIG. 1-3, the base is the power-generating insole 1; the base 1 is designed with one or several coupled power generating devices 2; the coupled power generating device 2 is fixed horizontally in the base 1 and kept parallel to the axis 1-1 of the base. As shown in FIG. 4-5, the generating set is designed with the column-shaped hollow shell 2-1; there is at least one group of magnetic induction coils with the same wire diameter in the center of the outer wall of the shell 2-1; there are some removable column-shaped magnets 2-3 in the cavity of the shell 2-1; there is a distance of more than 0 mm but less than or equal to 0.5 mm between the column-shaped magnet 2-3 and the inner wall of the shell 2-1; when the column-shaped magnets 2-3 in the generating set move in the shell 2-1, their field directions remain unchanged and always parallel to the axis 2-4 of the shell 2-1.

In accordance with the embodiment, the coupled power generating device 2 is arranged in parallel in the base 1.

The cross-sectional shape of the column-shaped hollow shell 2-1 is square, and thus it can also be called "a square column-shaped shell".

The shell 2-1 is made from the material which has smooth inner surface and certain hardness and cannot be absorbed by a magnet, such as polymer materials and metal material which cannot be absorbed by a magnet. PP, PVC, and PMMA are used preferably.

The magnetic induction coil 2-2 is tightly twined around the center position of the outer wall of the shell 2-1; the magnetic induction coil 2-2 is not twined around both ends of the outer wall of the shell 2-1.

In accordance with the embodiment, there is one group of magnetic induction coils 2-2 in FIG. 4, which are evenly twined around the outer wall of the shell 2-1; there are two groups of magnetic induction coils 2-2 in FIGS. 5: 2-2 (1) and 2-2 (2), both of which are twined evenly around the outer wall of the shell 2-1.

In accordance with the invention, the magnetic induction coil 2-2 is twined by enameled copper wire which is common copper wire in the market.

In accordance with the embodiment, the column-shaped magnet 2-3 is the common strong magnet in the market, and Nude N52 or NdFeB N35 strong magnet is used preferably;

the cross-sectional shape of the column-shaped magnet 2-3 is square, which is consistent with that of the shell 2-1; the cross-sectional dimension of the column-shaped magnet 2-3 is slightly smaller than that of the shell 2-1, in order to guarantee that the column-shaped magnet 2-3 can slide rapidly in the smooth shell 2-1.

Embodiment 2

Figure 6:
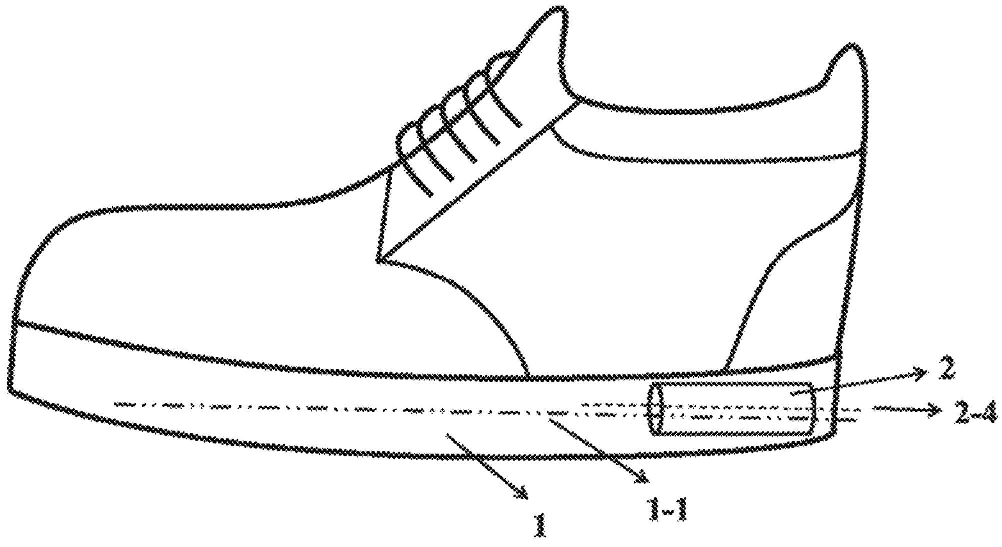
FIG. 6 is the schematic diagram of a light emitting shoe based on a coupled power generating device with a cylindrical shell in the invention.
Figure 7:
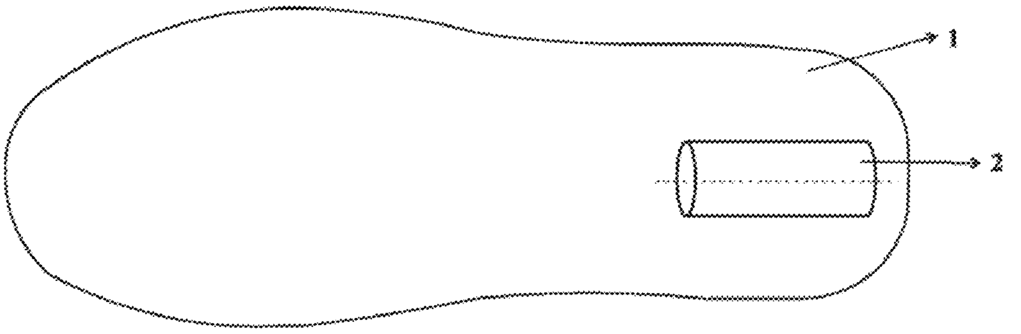
FIG. 7 is the schematic diagram of position arrangement of a coupled power generating device with a cylindrical shell in a light emitting shoe of the invention.
Figure 8:
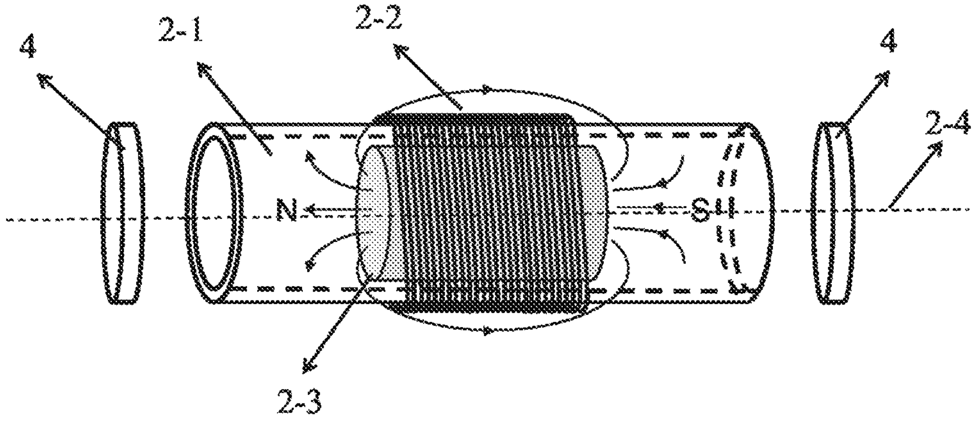
FIG. 8 is the structure diagram of a coupled power generating device (one group of magnetic induction coils) with a cylindrical shell in the invention.
Figure 9:
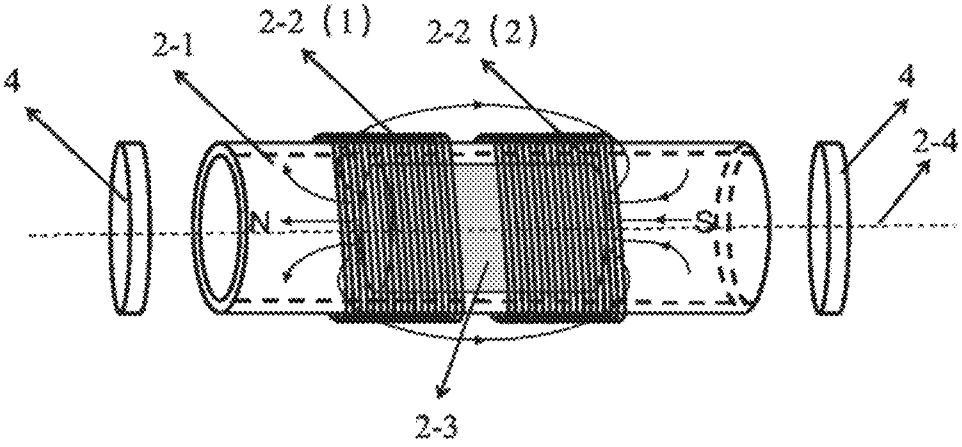
FIG. 9 is the structure diagram of a coupled power generating device (two groups of magnetic induction coils) with a cylindrical shell in the invention.

As shown in FIGS. 6 and 7, the base is the cavity 1 of the power-generating insole; the base 1 is designed with one or several coupled power generating devices 2; the coupled power generating device 2 is fixed horizontally in the base 1 and kept parallel to the axis 1-1 of the base. As shown in FIGS. 8 and 9, the generating set is designed with the column-shaped hollow shell 2-1; there is at least one group of magnetic induction coils 2-2 with the same wire diameter in the center of the outer wall of the shell 2-1; there are some removable column-shaped magnets 2-3 in the cavity of the shell 2-1; there is a distance of more than 0 mm but less than or equal to 0.5 mm between the column-shaped magnet 2-3 and the inner wall of the shell 2-1; when the column-shaped magnets 2-3 in the generating set move in the shell 2-1, their field directions remain unchanged and always parallel to the axis 2-4 of the shell 2-1.

In accordance with the embodiment, the coupled power generating device 2 is arranged in parallel in the base 1.

The cross-sectional shape of the column-shaped hollow shell 2-1 is round, and thus it can also be called "a cylindrical shell".

The shell 2-1 is made from the material which has smooth inner surface and certain hardness and cannot be absorbed by a magnet, such as polymer materials and metal material which cannot be absorbed by a magnet. PP, PVC, and PMMA are used preferably.

The magnetic induction coil 2-2 is tightly twined around the center position of the outer wall of the shell 2-1; the magnetic induction coil 2-2 is not twined around both ends of the outer wall of the shell 2-1.

In accordance with the embodiment, there is one group of magnetic induction coils 2-2 in FIG. 8, which are evenly twined around the outer wall of the shell 2-1; there are two groups of magnetic induction coils 2-2 in FIGS. 9: 2-2 (1) and 2-2 (2), both of which are twined evenly around the outer wall of the shell 2-1.

In accordance with the invention, the magnetic induction coil 2-2 is twined by enameled copper wire which is common copper wire in the market.

In accordance with the embodiment, the column-shaped magnet 2-3 is the common strong magnet in the market, and NdFeB N52 or NdFeB N35 strong magnet is used preferably; the cross-sectional shape of the column-shaped magnet 2-3 is round, which is consistent with that of the shell 2-1; the cross-sectional dimension of the column-shaped magnet 2-3 is slightly smaller than that of the shell 2-1, in order to guarantee that the column-shaped magnet 2-3 can slide rapidly in the smooth shell 2-1.

Figure 10:
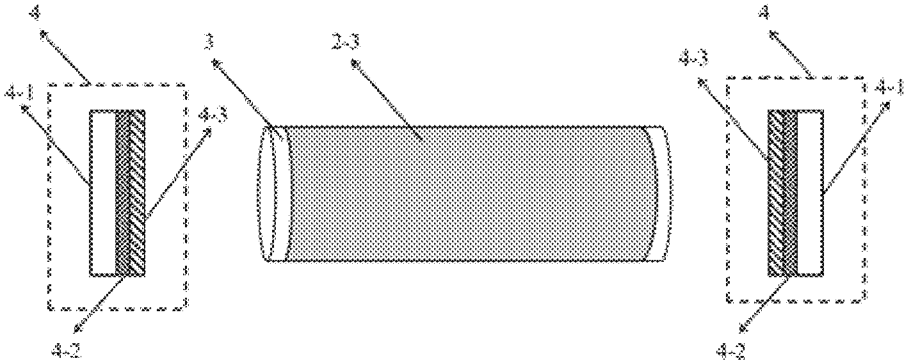
FIG. 10 is the structure diagram of a triboelectric nanogenerator (taking a cylindrical shell for example) in the invention.
Figure 11:
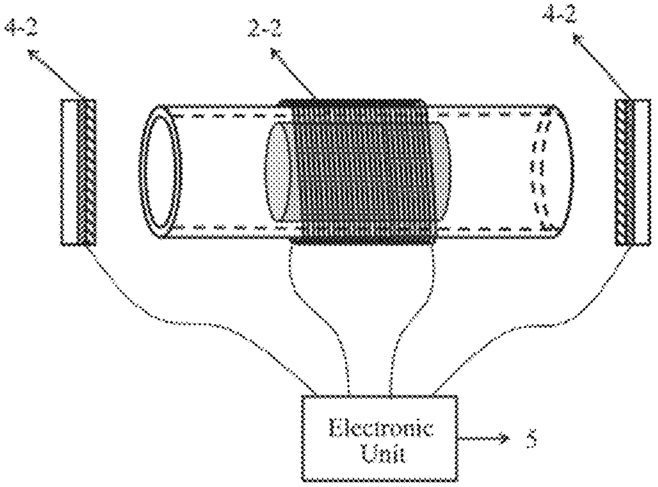
FIG. 11 is the schematic diagram of connection between a coupled power generating device (taking a cylindrical shell for example) and an electronic unit in the invention.

Taking the cylindrical shell for example, as shown in FIG. 10, there is conductive fabric or conductive polymer 3 at both ends of the column-shaped magnet 2-3; there is one triboelectric nanoscale generating unit 4 at both ends of the shell 2-1; the triboelectric nanoscale generating unit 4 is composed of a shell packaging plate 4-1, an electrode layer 4-2, and an insulating layer 4-3; the size of the packaging plate 4-1 of the shell is the same as the cross-sectional dimension of the shell 2-1; the electrode layer 4-2 is set in the side of the packaging plate 4-1 of the shell close to the column-shaped magnet 2-3; the insulating layer 4-3 is made from an insulating high-molecular polymer with certain thickness; the insulating layer 4-3 is closely connected with the electrode layer 4-2; the electronic unit 5 is linked to the magnetic induction coil 2-2 and the electrode layer 4-2, as shown in FIG. 11.

In accordance with the invention, the conductive fabric 3 is conductive silver cloth or copper-nickel alloy cloth, and the conductive silver cloth can be woven or knitted silver cloth.

The packaging plate 4-1 of the shell is a polymer plate with smooth surface, and PP, PVC and PMMA plates are used preferably.

The electrode layer 4-2 is conductive fabric or conductive polymer.

The electronic unit 5 comprises control circuit, LED light, Bluetooth or GPS positioning device.

The ratio of the sum of the cross-sectional dimension of the shell 2-1 and the wire diameter of the magnetic induction coil 2-2 to the sum of the number of turns of the magnetic induction coil 2-2 and the thickness of the insulating layer 4-3 of the triboelectric nanoscale generating unit can be adjusted in order to regulate and control the electrical properties of the coupled power generating device 2, including current and voltage.

Figure 12:
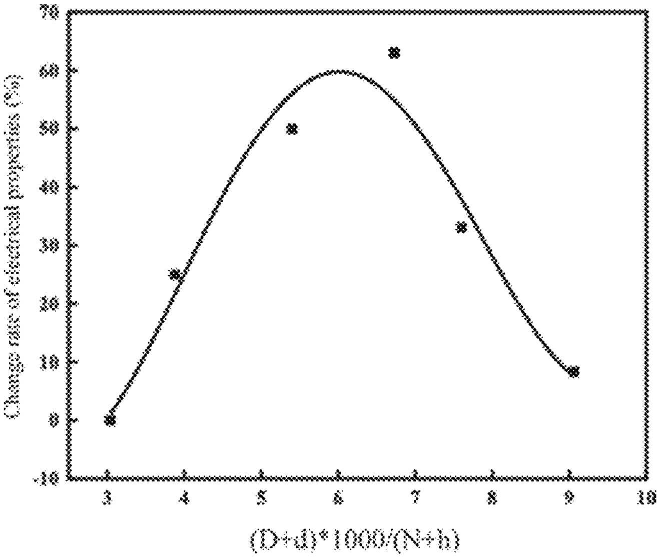
FIG. 12 is the effect of the ratio of the sum of the cross-sectional dimension of the shell and the wire diameter of the magnetic induction coil to the sum of the number of turns of the magnetic induction coil and the thickness of the insulating layer of the triboelectric nanoscale generating unit on the electrical properties of a coupled power generating device.

As shown in FIG. 12, in accordance with the invention, taking the properties of the current of the coupled power generating device 2 for example, the cross-sectional dimension of the shell 2-1, the wire diameter of the magnetic induction coil 2-2, the number of turns, and the thickness of the insulating layer 4-3 of the triboelectric nanoscale generating unit are set as "D", "d", "N", and "h" respectively; "D+d" represents the sum of the cross-sectional dimension of the shell 2-1 and the wire diameter of the magnetic induction coil 2-2, and "N+h" represents the sum of the number of turns of the magnetic induction coil 2-2 and the thickness of the insulating layer 4-3 of the triboelectric nanoscale generating unit. In the diagram, the abscissa shows the ratio of the sum of the cross-sectional dimension of the shell 2-1 and the wire diameter of the magnetic induction coil 2-2 to the sum of the number of turns of the magnetic induction coil 2-2 and the thickness of the insulating layer 4-3 of the triboelectric nanoscale generating unit; the ordinate shows the change rate (%) of electrical properties of the coupled power generating device 2. The concept of the change rate of electrical properties is that the change rate of the electrical property is 0% when the electrical property with the starting point of "(D+d)*1000/(N+h)=3" is set as the benchmark for comparison. When "(D+d)*1000/(N+h)" gradually increases, the change rate of the electrical properties of the coupled power generating device shows a non-linear relationship, that is, it shows a trend of increase first and then decrease.

Figure 13:
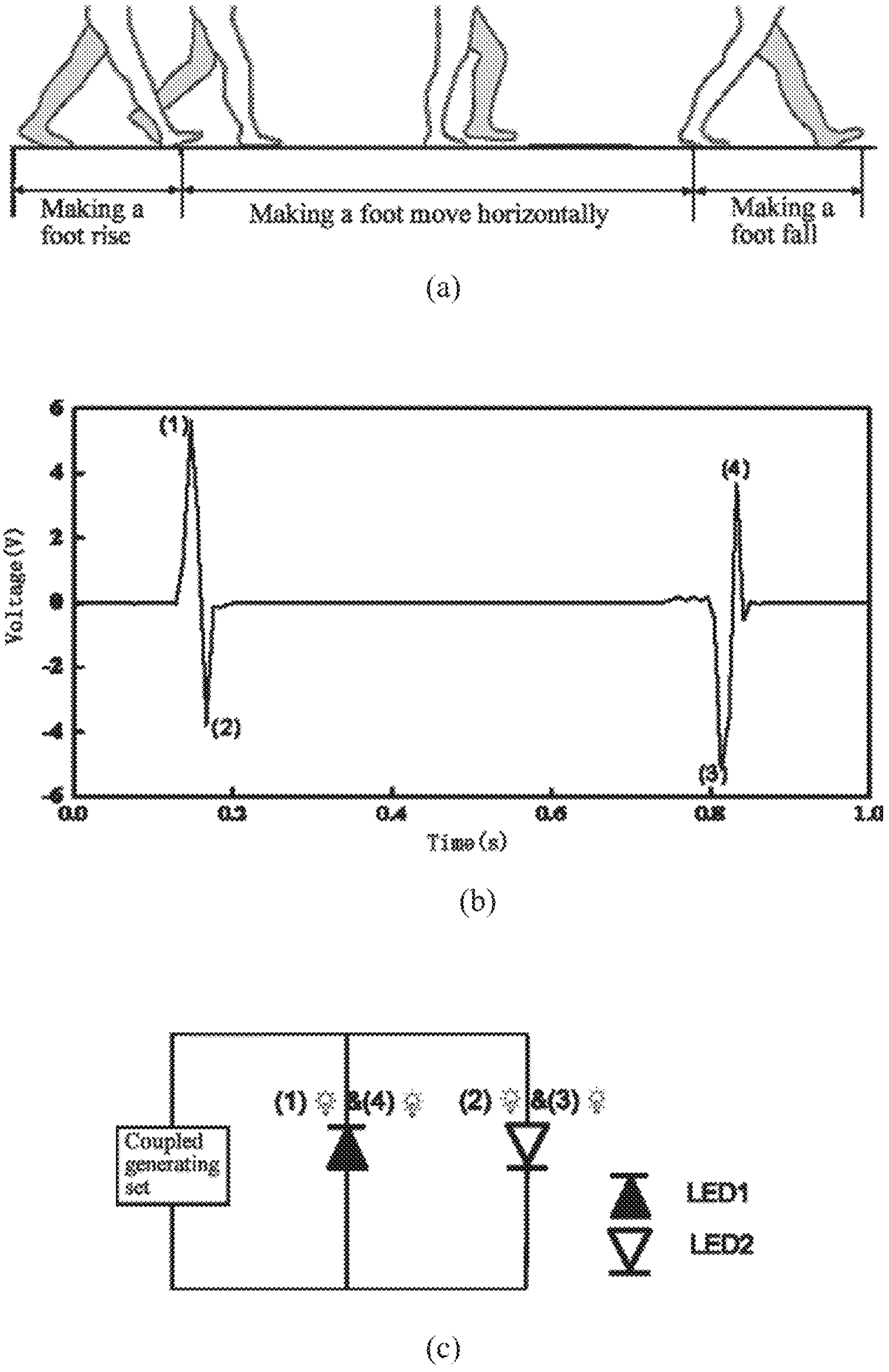
FIG. 13 is the schematic diagram (a) of people walking for description of the invention, the wave pattern (b) of induced voltage of a corresponding coupled power generating device, and the schematic diagram (c) of circuit connection of LED light in a light emitting shoe.

As shown in FIG. 13(*a*), the process of people walking can be roughly divided into three stages: making a foot rise, moving horizontally, and making a foot fall. In accordance with the invention, the column-shaped magnet 2-3 in the shell 2-1, under the effects of its own weight and human movement, moves along the inner wall of the shell 2-1 towards the direction of people walking, and rapidly cuts the magnetic induction coil 2-2 to generate induced voltage and current in the stage of making a foot rise. In a similar way, the column-shaped magnet 2-3 quickly falls back to the original position, and cuts the magnetic induction coil 2-2 again to generate induced voltage and current in the stage of making a foot fall. In the process of moving horizontally, the column-shaped magnet 2-3 does not move and thus will not generate induced voltage and current. As shown in FIG. 13(*b*), in accordance with the embodiment, taking the induced voltage for example, the column-shaped magnet 2-3 cuts the magnetic induction coil 2-2 to generate two amplitudes of wave crest (1) and wave trough (2) during people making a foot rise in one circle of people walking; the column-shaped magnet 2-3 cuts the magnetic induction coil 2-2 again to generate another two amplitudes of wave trough (3) and wave crest (4) during people making a foot fall in one circle of people walking. Therefore, four amplitudes of wave crests and troughs can be generated in one circle of people walking. FIG. 13(*c*) shows the mode of circuit connection of LED light. In accordance with the invention, the alternate parallel connection of positive and negative electrodes is used for LED light 1 and LED light 2. When one wave crest reaches the starting voltage (1.9 V) of LED light 1, LED light 1 will be illumined while LED light 2 will not be illumined; when another wave trough reaches the starting voltage (1.9 V) of LED light 2, LED light 2 will be illumined while LED light 1 will not be illumined.

The number of twinkles of the LED light during people walking is closely related to the ratio of the distance between the end face of the coil 2-2 and the end face of the shell 2-1 to the length of the coil 2-2. Through control of the relative size of the two, the amplitudes of the adjacent four wave crests and troughs (including voltage and current) can be controlled to make at least one pair of positive and negative amplitudes greater than the starting voltage (i.e., 1.9 V) of the LED light, and meanwhile the current is at least 4 mA. In this case, the LED light can twinkle twice at least in one circle of people walking. The amplitudes of the adjacent four wave crests and troughs (including voltage and current) can also be controlled to make two pairs of positive and negative amplitudes greater than the starting voltage (1.9 V) of the LED light, and the current is at least 4 mA. In this case, LED light can twinkle for four times in one circle of people walking.

In accordance with the invention, if LED light 1 and LED light 2 have the same color, an effect of continuously lighting can be achieved visually; if they have different colors, a cool effect of alternate twinkles between the two colors can be achieved.

Figure 14:
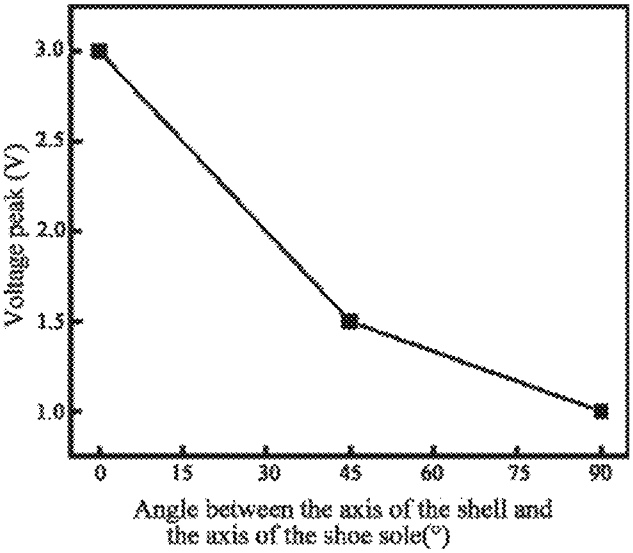
FIG. 14 is the relational graph of changes of the angle between the axis of the shell and the axis of the base along with the peak value of induced voltage.

As shown in FIG. 14, the peak value of the induced voltage gradually decreases with the increase of the angle between the axis 2-4 of the shell and the axis 1-1 of the base. When the angle is 0°, the voltage peak is the maximum. Therefore, during people walking, the axis 2-4 of the shell and the axis 1-1 of the base are relative static, and the angle of the axis 2-4 of the shell and the axis 1-1 of the base must always be zero, that is, the axis 2-4 of the shell and the axis 1-1 of the base must remain parallel.

Figure 15:
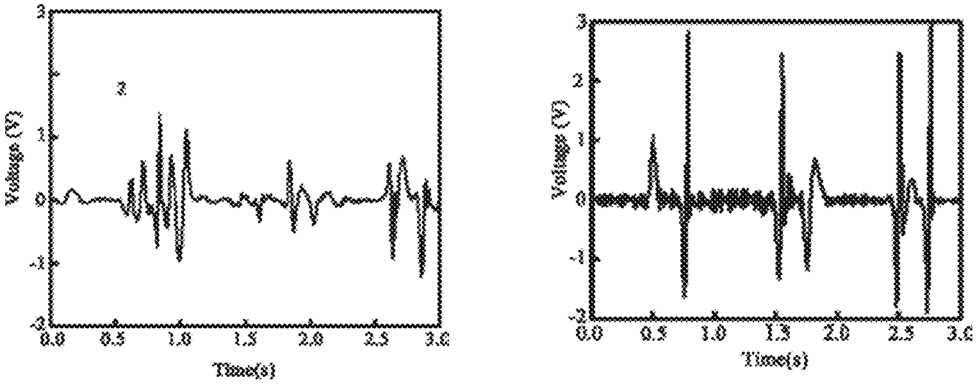
FIG. 15 is the wave pattern of induced voltage of a coupled power generating device in the two shapes of magnets: (a) spherical magnet; (b) column-shaped magnet.

The invention has investigated the effect of the field direction on the induced voltage. When people walk, the spherical magnet rolls freely in the shell 2-1; the field direction is changed arbitrarily, but the field direction of the column-shaped magnet is relatively changeless. FIG. 15(*a*) and (*b*) show the voltage values of the spherical magnet and the column-shaped magnet in three circles of people walking respectively. The voltage value of the spherical magnet is less than that of the column-shaped magnet, but the spherical magnet can generate more wave crests and troughs in one circle of people walking. The main reason is that the field direction of the spherical magnet is changed arbitrarily; when the magnetic induction line is cut in the changed magnetic field in one circle of people walking, the induced voltage will be large if the magnetic field is strong; on the contrary, the induced voltage will be small. However, the field direction of the column-shaped magnet is changeless; the magnetic induction line is cut in the strongest position of the magnetic field in one circle of people walking, thereby generating the maximum induced voltage. Therefore, during people walking, the field direction of the column-shaped magnet 2-3 relative to the axis 2-4 of the shell must always remain unchanged, and the field direction of the column-shaped magnet 2-3 is always along the direction parallel to the axis 2-4 of the shell.

The content mentioned above introduces a power-generating insole and a light emitting shoe based on a coupled power generating device, and it should be noted that the content mentioned above is the preferred embodiment only for the invention but cannot restrict the range of the technical solution of the embodiment of the invention. The technicians, in the field of the invention, can modify the implementation plan of the invention according to the actual purpose and requirements, or carry out equivalent replacement for a part of the technical features, but both of the modification and the replacement are in the scope of protection of the invention.

What is claimed is:

1. A coupled power generating device comprising:

a column-shaped hollow shell, at least one group of magnetic induction coils that is provided on a center of an outer wall of the column-shaped hollow shell, at least one removable column-shaped magnet that is provided in a cavity of an inner wall of the column-shaped hollow shell, two triboelectric nano generating units that are provided at both ends of the column-shaped hollow shell; wherein each of the triboelectric nano generating unit comprises a shell packaging plate, an electrode layer, and an insulating layer, the electrode layer is provided at one side of the packaging plate of the shell close to the column-shaped magnet;

an electronic unit connected to both ends of the magnetic induction coils, and the electronic unit connected to the electrode layer.

2. The device according to claim 1, wherein: a cross-sectional shape of the column-shaped hollow shell is round or square, which is consistent with that of the shell.

3. The device according to claim 1, wherein: a distance between the column-shaped magnet and the inner wall of the column-shaped hollow shell keeps more than 0 mm but less than or equal to 0.5 mm.

4. The device according to claim 1, wherein: both ends of the column-shaped magnet are provided with conductive fabric or conductive polymer.

5. The device according to claim 4, wherein: the conductive fabric is conductive silver cloth or copper-nickel alloy cloth.

6. The device according to claim 1, wherein: each of the magnetic induction coil is tightly twined around the center position of the outer wall of the shell, each of the magnetic induction coil is not twined around both ends of the outer wall of the shell.

7. The device according to claim 1, wherein: the packaging plate of the shell is a polymer plate with smooth surface.

8. The device according to claim 1, wherein: a ratio of the sum of the cross-sectional dimensions of the column-shaped hollow shell and a wire diameter of the magnetic induction coil, to the sum of the number of turns of the magnetic induction coil and a thickness of the insulating layer is less than or equal to 0.004, or greater than or equal to 0.0085.

9. A power-generating insole, comprising the coupled power generating device of claim 1.

* * * * *